May 2, 1950          C. BARBIERI          2,505,748
LID FOR PAPER CONTAINERS
Filed Aug. 12, 1948
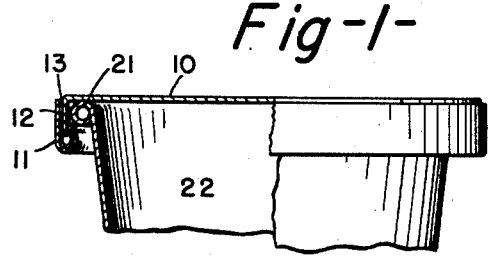
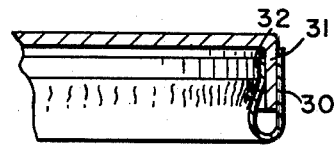
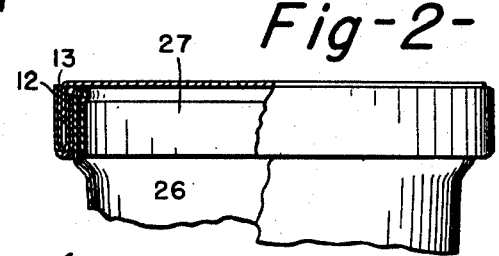
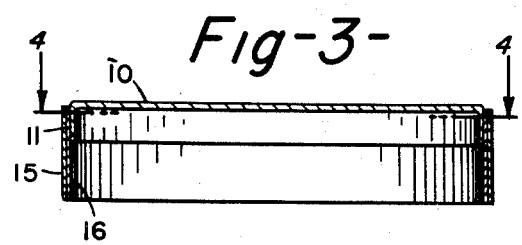
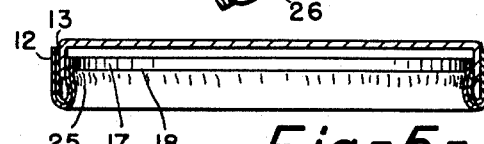
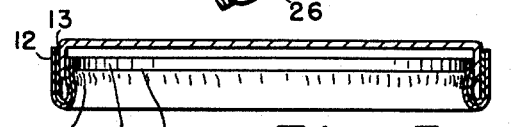
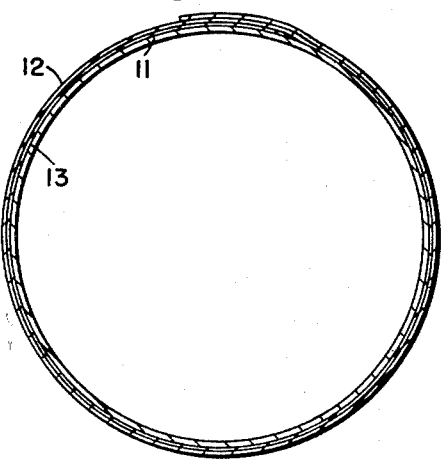
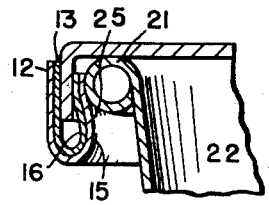
INVENTOR.
CESARE BARBIERI
BY Luther W. Hawley
ATTORNEY Patented May 2, 1950

2,505,748

UNITED STATES PATENT OFFICE 2,505,748

LID FOR PAPER CONTAINERS

Cesare Barbieri, New York, N. Y., assignor to Dixie Cup Company, Chicago, Ill., a corporation of Delaware Application August 12, 1948, Serial No. 43,839

4 Claims. (Cl. 229—5.5)

This invention relates to covers or lids for paper containers or cups.

Paper containers are now used for many commodities, such as liquids or food products, cold or hot, etc.

It often becomes desirable to close such containers to protect the contents and covers are often removed and replaced many times. It is desirable, moreover, that the cover or lid protect the upper edge of the container from exposure or contamination.

Paper containers vary widely in shape and size. For instance, some containers have beads at the upper edge, others have a flat upper edge.

This invention has for its salient object to provide a container cover or lid so constructed that it will readily and tightly fit and seal the upper ends or rims of containers of varying sizes and conformation or shape.

Another object of the invention is to provide a container lid or cover so constructed that it will have a yielding contact with the outer surface of the upper edge or rim of the container.

Another object of the invention is to provide a container lid or cover so constructed that it can be used repeatedly and will effectively close and seal the container on such repeated use.

Another object of the invention is to provide a container cover or lid so constructed that it will fit tightly on the container when pressed down to partial or to its extreme downward position on the container.

Another object of the invention is to provide a container lid or cover so constructed that it will effectively fit and seal a rolled edge or straight or flat container edge or wall.

Further objects of the invention will appear from the following specification taken in connection with the drawings which form a part of this application, and in which:

Fig. 1 is an elevational view, partly in section, illustrating the container lid or cover in closing position on a paper cup having a rolled top;

Fig. 2 is a view similar to Fig. 1 illustrating the cover or lid in closing position on a container having a straight wall at the upper end;

Fig. 3 is a transverse sectional elevation of the cover or lid showing the encircling band or strip before the lower portion thereof has been folded inwardly or upwardly;

Fig. 4 is a sectional elevation taken substantially on line 4—4 of Fig. 3, looking in the direction of the arrows;

Fig. 5 is a sectional elevation of the lid or cover in completed form before it is applied to the container;

Fig. 6 is an enlarged sectional elevation of a portion of a lid in which the encircling band consists of a single ply or strip of material instead of a multiple ply as shown in the preceding figures;

Fig. 7 is a view similar to Fig. 2 but illustrating the construction in an enlarged section; and Fig. 8 is an enlarged section of the construction shown in Fig. 1.

In the embodiment of the invention illustrated in Figs. 1 to 5, 7 and 8, the container cover or lid comprises a body portion or disk 10 having an annular depending flange 11 at the periphery thereof. A strip or ribbon of paper is wrapped around the flange 11 and in this form of the invention the strip or ribbon is wrapped around the flange to form two plies 12 and 13. This double wrap or two ply construction is more permanent and secure than a single wrap, which tends to become unglued and open up. The plies 12 and 13 at the portions thereof opposite the flange are secured to each other and to the outer surface of the flange.

The strip or ribbon is of sufficient width to form a depending portion which extends below the lower edge of the flange 11, these depending portions being shown at 15 and 16 in Fig. 3, attention being called to the fact that the portions 15 and 16 are not glued or secured to each other. The depending portions 15 and 16 are then folded inwardly and upwardly to the position shown in Fig. 5, in which the ends of these portions are disposed within the inner surface of the flange 11, this folding operation being carried out in such a manner that the fibers of the paper will not be broken down or injured. The inner ends of the portions 15 and 16 are then preferably flattened or ironed, as shown at 17, to form a shoulder at 18 which, as shown in Fig. 1, fits snugly around the under half of the roll or bead 21 formed on the upper end of the container 22.

Attention is called to the fact that a bulge or cushion 25 is formed by the inturned portions 15 and 16 of the band which encircles the flange 11. When the cover shown in Fig. 5 is applied to a container 22 with a rolled or beaded end 21 in the manner shown in Fig. 1, the cushion 25 is compressed as the cover is pressed downwardly over the beaded end 21, and due to the resiliency of the material in the portions 15 and 16 of the plies 12 and 13, a tight seal will be formed around the bead 21.

This cover is equally well adapted for use on a container such as that shown at 26 in Fig. 2, having a flat or straight wall 27 at the upper end thereof. When the cover is placed on this container, the portions 15 and 16 of the plies of the encircling band are flattened out and slide upwardly against the inner surface of of the flange 11.

It will be evident that the cushion or bulge 25 adapts the cover or lid for use on containers of different shapes and sizes.

In the form of the invention illustrated in Fig. 6, a single strip or ribbon 30 of material is wound around and secured to the outer surface of the flange 31, and this strip is folded inwardly and upwardly so that the inner portion 32 thereof will engage the inner surface of the flange 31 as the cover is applied to the container. This cover is used in the same manner as illustrated in Figs. 1 to 5, 7 and 8.

The preferred form of the invention is the two ply construction since the tool used in the spinning or folding operation engages the ply 15 and does not come in contact with the ply 16 or the inner ply in the completed cover. Thus, any tendency of the tool to break down or injure the fibers and lessen the resiliency thereof is not communicated to the ply 16 which retains its normal resiliency. Moreover, when the lid shown in Figs. 1 to 5, 7 and 8 is coated with wax, the wax coating does not penetrate the inner ply of the fold and the resiliency of the cushion is retained.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What I claim is:

1. A paper cover for a container comprising a disk having an annular depending flange on the periphery thereof, and a band encircling and secured to said flange and extending beyond the flange, the free end of the band being folded back on itself and extending upwardly to a position disposed within the inner surface of the flange and being slidable relative thereto.

2. A paper cover for a container comprising a disk having an annular depending flange on the periphery thereof, and a multi-ply band encircling and secured to said flange and extending beyond the flange, the free end of the band being turned inwardly and upwardly within the inside surface of the flange, the plies of the band being secured to each other at the portions thereof encircling the flange and being free from each other at the inturned portions thereof.

3. A paper cover for a container comprising a disk having an annular depending flange on the periphery thereof, and a multi-ply band encircling and secured to said flange and extending beyond the flange, the free end of the band being turned inwardly and upwardly within the inside surface of the flange, the plies of the band being secured to each other at the portions thereof encircling the flange and being free from each other at the inturned portions thereof and the inner edges of the inturned plies of the band being compressed and flattened.

4. A paper cover for a container comprising a disk having an annular flange depending from the periphery thereof, and a strip of paper encircling and secured to said flange and extending below the flange, the portion of the strip extending beyond the flange being folded back, inwardly and upwardly and extending to a position within the inner surface of the flange, said folded portion having a normally convex inner surface and the portion within the flange being slidable thereon.

CESARE BARBIERI.

REFERENCES CITED

The following references are of record in the file of this patent:

UNITED STATES PATENTS

| Number | Name | Date |
|---|---|---|
| 1,857,021 | Hicks | May 3, 1932 |
| 1,925,471 | Taylor | Sept. 5, 1933 |
| 2,233,489 | Reifsnyder | Mar. 4, 1941 |
| 2,305,506 | Wilcox | Dec. 15, 1942 |
| 2,383,760 | Barbieri | Aug. 28, 1945 |

FOREIGN PATENTS

| Number | Country | Date |
|---|---|---|
| 826,119 | France | Dec. 27, 1937 |